United States Patent
Idnani et al.

(10) Patent No.: US 6,999,774 B2
(45) Date of Patent: Feb. 14, 2006

(54) METHOD AND SYSTEM FOR HANDLING MESSAGES ADDRESSED TO MULTIPLE MOBILE NODES

(75) Inventors: Ajaykumar R Idnani, Schaumburg, IL (US); Timothy J Wilson, Rolling Meadows, IL (US); Ajoy Kumar Singh, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 70 days.

(21) Appl. No.: 10/687,398

(22) Filed: Oct. 15, 2003

(65) Prior Publication Data

US 2005/0083868 A1    Apr. 21, 2005

(51) Int. Cl.
*H04Q 7/20*    (2006.01)
(52) U.S. Cl. .......... 455/450; 455/445; 455/552.1; 370/338; 370/397; 709/224; 709/217
(58) Field of Classification Search ........ 455/445, 455/450, 552.1, 422.1; 370/338, 342, 343, 370/399, 397, 401; 709/223, 224, 217
See application file for complete search history.

(56) References Cited

U.S. PATENT DOCUMENTS

| | | | |
|---|---|---|---|
| 6,445,922 B1 | 9/2002 | Hiller et al. | |
| 6,718,999 B1 * | 4/2004 | Elsey | 137/14 |
| 2002/0009066 A1 * | 1/2002 | Shimizu et al. | 370/338 |
| 2002/0018476 A1 * | 2/2002 | Roy | 370/401 |
| 2002/0026482 A1 | 2/2002 | Morishige et al. | |
| 2002/0176414 A1 * | 11/2002 | Miki et al. | 370/389 |
| 2003/0073453 A1 * | 4/2003 | Basilier | 455/503 |
| 2003/0179742 A1 * | 9/2003 | Ogier et al. | 370/351 |
| 2003/0202505 A1 * | 10/2003 | Ozugur | 370/352 |
| 2005/0053034 A1 * | 3/2005 | Chiueh | 370/331 |

* cited by examiner

*Primary Examiner*—Danh Cong Le

(57) ABSTRACT

A home agent (104, 108) and a foreign agent (110, 114) in a wireless communication system (100) establish (202) a special communications channel (140–154) between themselves, the special communications channel dedicated to messages addressed to multiple mobile nodes. The home agent then detects (206) whether a message received by the home agent is addressed to multiple mobile nodes. When the message is addressed to multiple mobile nodes, the home agent sends (208) the message to the foreign agent through the special communications channel.

20 Claims, 1 Drawing Sheet

METHOD AND SYSTEM FOR HANDLING MESSAGES ADDRESSED TO MULTIPLE MOBILE NODES

FIELD OF THE INVENTION

This invention relates in general to wireless communication systems, and more specifically to a method and system for handling messages addressed to multiple mobile nodes.

BACKGROUND OF THE INVENTION

In the mobile Internet Protocol (IP) world there currently is not any special treatment for messages that are addressed to multiple mobile nodes, e.g., Broadcast and Multicast messages. So, if a home agent (i.e., software that acts on behalf of mobile nodes assigned to the home agent to facilitate the communication of messages to and from the mobile nodes) receives a Broadcast or Multicast packet, it tunnels the packet down each and every unicast tunnel for all the mobile nodes that it is serving. This solution works well when there are not many mobile nodes, or when the mobile nodes are mostly in their home subnet, but when the number of mobile nodes increases and some are in foreign subnets served by foreign agents, this solution becomes clearly inefficient and causes an unnecessary waste of the network bandwidth. Also when multiple mobile nodes are connected to the same foreign agent, the foreign agent will receive multiple copies of the Broadcast or Multicast packet over multiple unicast tunnels and will send multiple copies out on its subnet to the mobile nodes. The mobile nodes will thus end up receiving multiple copies of the same packet, and will need to deal with the copies. This is again inefficient use of the network bandwidth and of the processing resources of the mobile nodes.

Thus, what is needed is a method and system for handling messages addressed to multiple mobile nodes. The method and system in some embodiments can reduce the network bandwidth and processing resources required to handle such messages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PREFERRED EMBODIMENTS

In overview, the present disclosure concerns wireless communications systems that utilize Internet Protocol (IP) to provide service for mobile nodes or more specifically for users thereof operating therein. More particularly, various inventive concepts and principles embodied as a method and system for specially handling messages addressed to multiple mobile nodes for use in equipment with such communications systems will be discussed and disclosed. The communications systems of particular interest are those being deployed and developed such as CDMA (Code Division Multiple Access), W-CDMA (Wideband-CDMA), CDMA2000, 2.5G (Generation), 3G, UMTS (Universal Mobile Telecommunications Services), OFDM (orthogonal frequency division multiplexing), IDEN™ systems and evolutions thereof that utilize mobile IP or an equivalent, although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional processors, or with integrated circuits (ICs) such as custom or application specific ICs, or with or in software instructions or programs. It is expected that one of ordinary skill, notwithstanding possibly significant effort and many design choices motivated by, for example, available time, current technology, and economic considerations, when guided by the concepts and principles disclosed herein will be readily capable of generating such software programs, programming such processors, or generating such ICs with minimal experimentation. Therefore, in the interest of brevity and minimization of any risk of obscuring the principles and concepts according to the present invention, further discussion of such software, processors and ICs, if any, will be limited to the essentials with respect to the principles and concepts employed by the preferred embodiments.

Figure 1:
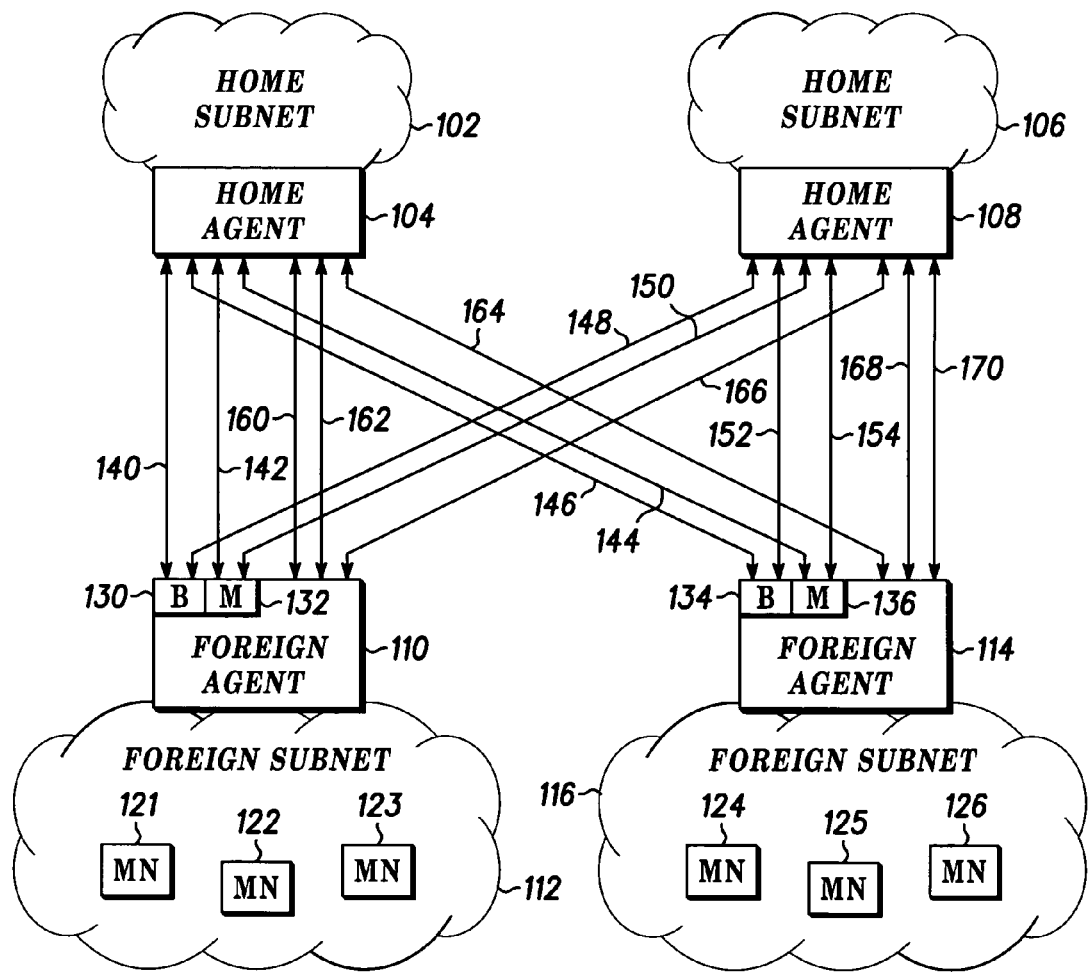
FIG. 1 is an electrical block diagram of an exemplary wireless communication system.

Referring to FIG. 1, an electrical block diagram of an exemplary wireless communication system 100 includes first and second home agents 104, 108 coupled to first and second home subnets 102, 106 providing wireless communications. The system 100 further comprises first and second foreign agents 110, 114 coupled to first and second foreign subnets 112, 116 providing wireless communications. The first and second home subnets 102, 106 and the first and second foreign subnets 112, 116 preferably are similar to the Wireless Local Area Network (WLAN) products, using protocols such as IEEE 802.11 that are available from various manufacturers. The first and second home agents 104, 108 preferably utilize well-known unicast tunnels 160–170 for sending messages directly addressed to one of the mobile nodes 121–126 assigned to the first and second home agents 104, 108 and visiting the first and second foreign subnets 112, 116.

In accordance with the present invention, the first and second foreign agents 110, 114 each preferably open two separate ports 130, 132 and 134, 136, where they will receive all Broadcast and Multicast traffic. The first and second home agents 104, 108 each then establish two special communications channels 140–154 between themselves and the ports 130–136. The first and second home agents 104, 108 will differentiate the traffic depending on the destination address, and if the destination address is a Broadcast address, e.g., 255.255.255.255, they will send the packet to the Broadcast ports 130, 134 of the foreign agents 110, 114. Similarly if the destination address is a Multicast address, e.g., 224.2.127.254, the first and second home agents 104, 108 will send the packet to the Multicast ports 132, 136.

To explain this in simpler terms it will be beneficial to understand how this can be implemented. Let us assume that, in one embodiment, we use IP-in-IP encapsulation to tunnel all our IP traffic. The first and second foreign agents 110, 114 would then establish two separate IP-in-IP tunnels, one for Broadcast and the second for Multicast with the first and second home agents 104, 108. The broadcast and multicast packets are encapsulated inside another IP packet. The destination address of the encapsulating IP packet will contain the IP address of the receiving foreign agent. The destination address of encapsulated IP packet will contain the broadcast or multicast address. All home agents 104, 108 that have mobile nodes currently under the coverage of a foreign agent 110, 114 and have some Broadcast or Multicast packets to send will send them through those IP-in-IP tunnels. This will insure that the foreign agents 110, 114 receive only one copy of the Broadcast and Multicast packets, thus saving some network bandwidth and by virtue of sending fewer copies to the mobile nodes 121–126, some processing resources too. It will be appreciated that, alternatively, we can utilize Generic Routing Encapsulation (GRE), minimal encapsulation, or any other form of tunnel mechanism available now or in the future to tunnel the Broadcast and Multicast packets in accordance with the present invention.

We can further optimize this solution for Multicast traffic, by further programming the home agents 104, 108 to monitor Multicast Join messages from the mobile nodes 121–126, and then only send Multicast traffic to the foreign agents 110, 114 that have mobile nodes 121–126 that have joined the Multicast group.

In the above diagram let us assume that MN 121, MN 122 and MN 124 are served by the first home agent 104, and that MN 123, MN 125 and MN 126 are served by the second home agent 108. Also let us assume that MN 121–MN 123 are under the coverage of the first foreign agent 110 and MN 124–MN 126 are under the coverage of the second foreign agent 116.

Now when the first home agent 104 receives a Broadcast packet it needs to tunnel this packet to the first foreign agent 110 (for MN 121 and MN 122), and to the second foreign agent 114 (for MN 124). If the first home agent 104 were only using unicast tunnels (as in the prior art), it would need to send the Broadcast packet down the two unicast tunnels 160, 162 to MN 121 and MN 122 on the first foreign agent 110 and the unicast tunnel 164 to MN 124 on the second foreign agent 114. But with the use of the Broadcast channel in accordance with the present invention, it only needs to send one copy each to the first and second foreign agents 110, 114, which would then send that as Broadcast packets on their subnets 112, 116. The same principles and concepts apply for Multicast. The advantages are magnified substantially when supporting, for example, thousands of mobile nodes across hundreds of foreign agents.

It will be appreciated that, alternatively, a single special communications channel can be established instead to send both Broadcast messages and Multicast messages from the home agent to the foreign agent. In addition, it will be appreciated that as a further alternative, the foreign agent can monitor Multicast Join messages sent from some of the plurality of mobile nodes; and then send Multicast traffic only to ones of the plurality of mobile nodes that have sent one of the Multicast Join messages. As yet another alternative, the home agent can monitor Multicast Join messages sent from some of the plurality of mobile nodes, and can send Multicast traffic only to ones of the plurality of foreign agents that serve a mobile node that has sent one of the Multicast Join messages.

In order to provide backwards compatibility with legacy Mobile IP systems, some embodiments of the foreign agent negotiate with the home agent to determine whether the home agent is able to support the special communications channel. In one embodiment, when a mobile node sends a Registration message to the foreign agent, the foreign agent appends an extension, e.g., a few extra bytes containing a special data sequence not used in the legacy systems, to the Registration message to create an appended Registration message, the extension advertising support for the special communications channel. The foreign agent then forwards the appended Registration message to the home agent. In response to receiving the extension, the home agent in accordance with the present invention responds to the foreign agent with an indication, e.g., the special data sequence, that the home agent supports the special communications channel. The home and foreign agents can then proceed to establish one or more of the special communications channels 140–154 for handling the Broadcast/Multicast traffic. On the other hand, when the home agent is a legacy device that cannot support the special communications channel, the home agent will not understand the extension and thus will not respond with the indication that it supports the special communications channel.

Figure 2:
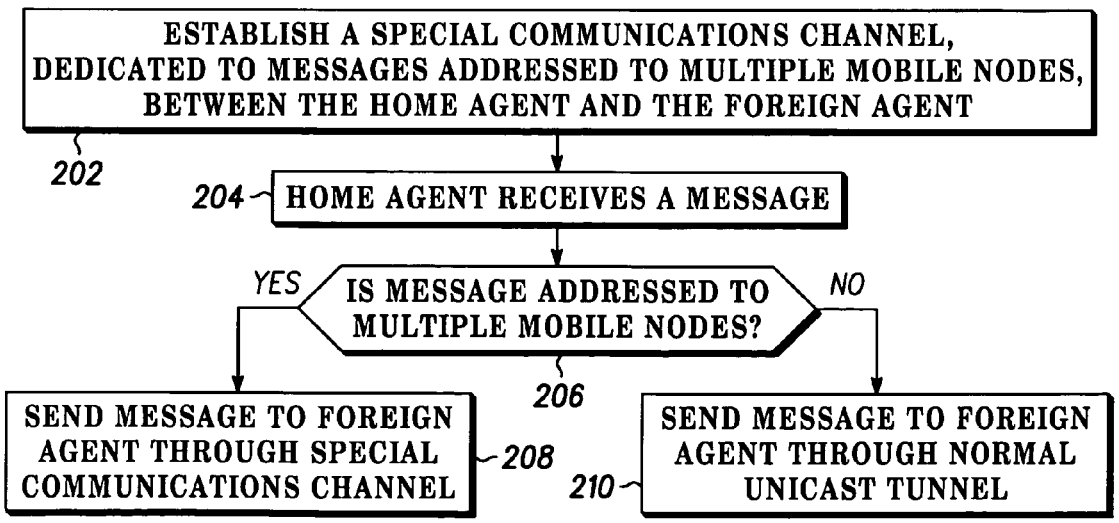
FIG. 2 is a flow diagram depicting operation of the exemplary wireless communication system.

Referring to FIG. 2, a flow diagram 200 depicting operation of the exemplary wireless communication system 100 begins with establishing 202 a special communications channel, dedicated to messages addressed to multiple mobile nodes, between a home agent and a foreign agent. Later, the home agent receives 204 a message for one of its mobile nodes visiting a foreign subnet. In response, the home agent detects 206 whether the message is addressed to multiple mobile nodes. If so, the home agent sends 208 the message to the foreign agent through the special communications channel. If not, the home agent sends 210 the message to the foreign agent through a standard unicast tunnel. Note that the order of events is not fixed here, as the message may be received and then the special communications channel can be established, for example.

It will be appreciated that, in some embodiments, the wireless communication system 100 can take the form of a software program comprising executable instructions for specially handling messages addressed to multiple mobile nodes in the wireless communication system 100. In this embodiment, the software program when executed in the home agent or in the foreign agent, programs the home agent or the foreign agent to operate in accordance with the present invention, as disclosed herein above.

Thus, it should be clear from the preceding disclosure that the present invention provides a method and system for specially handling messages addressed to multiple mobile nodes. The method and apparatus advantageously reduces the network bandwidth and processing resources required to handle such messages.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. For example, while much of the terminology and architecture utilized herein above in describing the embodiments would allow the wireless communication system 100 to be based upon Mobile IP as described in the Internet Engineering Task Force (IETF) Request for Comments (RFC) 3220, other present and future mobility solutions can be employed as well with the present invention. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for specially handling messages addressed to multiple mobile nodes in a wireless communication system comprising a home agent serving a home subnet and a foreign agent serving a foreign subnet, the home agent communicating with the foreign agent through a plurality of unicast tunnels corresponding to a plurality of mobile nodes served by the foreign agent, the method comprising:
    establishing at least one special communications channel separate from the unicast tunnels between the home agent and the foreign agent, the special communications channel dedicated to messages addressed to multiple mobile nodes;
    detecting whether a message received by the home agent is addressed to multiple mobile nodes; and
    when the message is addressed to multiple mobile nodes, sending the message to the foreign agent through the special communications channel.

2. The method of claim 1,
    wherein the messages addressed to multiple mobile nodes can include Broadcast messages and Multicast messages, and
    wherein detecting whether the message received by the home agent is addressed to multiple mobile nodes comprises detecting whether the message is addressed as one of a Broadcast message and a Multicast message.

3. The method of claim 1,
    wherein establishing the special communications channel comprises establishing a first channel for Broadcast messages and a second channel for Multicast messages, and
    wherein sending the message to the foreign agent comprises sending a Broadcast message through the first channel and sending a Multicast message through the second channel.

4. The method of claim 1,
    wherein establishing the special communications channel comprises establishing a single channel for sending both Broadcast messages and Multicast messages, and
    wherein sending the message to the foreign agent comprises sending the message through the single channel when the message is one of a Broadcast message and a Multicast message.

5. The method of claim 1, wherein establishing the special communications channel comprises opening an IP-in-IP tunnel between the foreign agent and the home agent for receiving the messages addressed to multiple mobile nodes.

6. The method of claim 1, wherein establishing the special communications channel comprises opening a minimal encapsulation tunnel between the foreign agent and the home agent for receiving the messages addressed to multiple mobile nodes.

7. The method of claim 1, wherein establishing the special communications channel comprises opening a Generic Routing Encapsulation (GRE) tunnel between the foreign agent and the home agent for receiving the messages addressed to multiple mobile nodes.

8. The method of claim 1,
    wherein the wireless communication system comprises a plurality of foreign agents coupled to the home agent, and
    wherein the method further comprises monitoring, by the home agent, Multicast Join messages sent from some of the plurality of mobile nodes, and
    wherein sending the message to the foreign agent comprises sending Multicast traffic only to ones of the plurality of foreign agents that serve a mobile node that has sent one of the Multicast Join messages.

9. The method of claim 1, further comprising in the foreign agent:
    monitoring Multicast Join messages sent from some of the plurality of mobile nodes; and
    sending Multicast traffic only to ones of the plurality of mobile nodes that have sent one of the Multicast Join messages.

10. The method of claim 1, wherein establishing the special communications channel comprises:
    sending a Registration message from one of the plurality of mobile nodes to the foreign agent;
    appending, by the foreign agent in response to the Registration message, an extension to the Registration message to create an appended Registration message, the extension advertising support for the special communications channel; and
    forwarding the appended Registration message from the foreign agent to the home agent.

11. The method of claim 10, wherein establishing the special communications channel further comprises by the home agent in response to receiving the extension:
    responding to the foreign agent with an indication that the home agent supports the special communications channel.

12. A wireless communication system for specially handling messages addressed to multiple mobile nodes, the wireless communication system comprising:
    a home agent for communicating with a foreign agent through a plurality of unicast tunnels corresponding to a plurality of mobile nodes served by the foreign agent, wherein the home agent is arranged and programmed to:
        establish at least one special communications channel between the home agent and the foreign agent, the special communications channel dedicated to messages addressed to multiple mobile nodes and wherein the special communications channel is separate from the unicast tunnels;
        detect whether a message received by the home agent is addressed to multiple mobile nodes; and
        when the message is addressed to multiple mobile nodes, send the message to the foreign agent through the special communications channel.

13. The wireless communication system of claim 12, wherein the home agent is further arranged and programmed to:

establish a first channel for Broadcast messages and a second channel for Multicast messages, and send a Broadcast message through the first channel and a Multicast message through the second channel.

14. The wireless communication system of claim 12, wherein the home agent is further arranged and programmed to:

establish a single channel for sending both Broadcast messages and Multicast messages; and send the message received by the home agent through the single channel when the message is one of a Broadcast message and a Multicast message.

15. The wireless communication system of claim 12, further comprising a plurality of foreign agents coupled to the home agent, and wherein the home agent is further arranged and programmed to:

monitor Multicast Join messages sent from some of the plurality of mobile nodes, and send Multicast traffic only to ones of the plurality of foreign agents that serve a mobile node that has sent one of the Multicast Join messages.

16. The wireless communication system of claim 12, further comprising the foreign agent, wherein the foreign agent is further arranged and programmed to:

monitor Multicast Join messages sent from some of the plurality of mobile nodes; and send Multicast traffic only to ones of the plurality of mobile nodes that have sent one of the Multicast Join messages.

17. The wireless communication system of claim 12, further comprising the foreign agent, wherein the foreign agent is further arranged and programmed to:

receive a Registration message from one of the plurality of mobile nodes;

append, in response to the Registration message, an extension to the Registration message to create an appended Registration message, the extension advertising support for the special communications channel; and forward the appended Registration message to the home agent.

18. The wireless communication system of claim 17, wherein the home agent is further arranged and programmed, in response to receiving the extension, to:

respond to the foreign agent with an indication that the home agent supports the special communications channel.

19. A software program comprising executable instructions for specially handling messages addressed to multiple mobile nodes in a wireless communication system including a home agent serving a home subnet and a foreign agent serving a foreign subnet; the home agent communicating with the foreign agent through a plurality of unicast tunnels corresponding to a plurality of mobile nodes served by the foreign agent, wherein the software program, when executed in the home agent, programs the home agent to:

establish a special communications channel between the home agent and the foreign agent, the special communications channel dedicated to messages addressed to multiple mobile nodes wherein the special communications channel is separate from the unicast tunnel;

detect whether a message received by the home agent is addressed to multiple mobile nodes; and when the message is addressed to multiple mobile nodes, send the message to the foreign agent through the special communications channel.

20. The software program of claim 19, wherein the messages addressed to multiple mobile nodes can include Broadcast messages and Multicast messages, and wherein the software program further programs the home agent to detect whether the message received by the home agent is addressed as one of a Broadcast message and a Multicast message.

* * * * *